(12) United States Patent
Iwano

(10) Patent No.: US 10,583,732 B2
(45) Date of Patent: Mar. 10, 2020

(54) TRANSMISSION DEVICE FOR HYBRID VEHICLE

(71) Applicant: MAHLE FILTER SYSTEMS JAPAN CORPORATION, Tokyo (JP)

(72) Inventor: Haruo Iwano, Tokyo (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 292 days.

(21) Appl. No.: 15/466,027

(22) Filed: Mar. 22, 2017

(65) Prior Publication Data

US 2017/0274757 A1    Sep. 28, 2017

(30) Foreign Application Priority Data

Mar. 24, 2016    (JP) .................................. 2016-059340

(51) Int. Cl.
*B60K 6/547*    (2007.10)
*B60K 6/387*    (2007.10)
(Continued)

(52) U.S. Cl.
CPC ................ *B60K 6/547* (2013.01); *B60K 6/36* (2013.01); *B60K 6/387* (2013.01); *B60K 6/48* (2013.01); *F16D 21/04* (2013.01); *F16D 48/06* (2013.01); *F16H 3/091* (2013.01); *B60K 2006/4808* (2013.01); *B60K 2006/4825* (2013.01); *B60K 2006/4841* (2013.01);
(Continued)

(58) Field of Classification Search
CPC .......... B60K 6/547; B60K 6/36; B60K 6/387; B60K 6/48; B60K 2006/4808; B60K 2006/4825; B60K 2006/541; F16H 3/091

USPC .......................................................... 74/661
See application file for complete search history.

(56) References Cited

U.S. PATENT DOCUMENTS 6,053,842 A *   4/2000   Kitada ..................... B60K 6/48
                                                    477/5
7,093,517 B2 *  8/2006   Hanyu ...................... B60K 6/36
                                                    475/5

(Continued)

FOREIGN PATENT DOCUMENTS

DE    10 2010 030 572 A1    12/2011
EP        2 505 408 A1      10/2012
(Continued)

OTHER PUBLICATIONS

Japanese Office Action, dated Jan. 7, 2020, 5 pages.

*Primary Examiner* — Ha Dinh Ho
(74) *Attorney, Agent, or Firm* — Foley & Lardner LLP

(57) ABSTRACT

A transmission device for a hybrid vehicle including: a plurality of shift dog clutches each arranged to selectively engage the movable side gear of one of the shift gear rows with the other of the main shaft and the counter shaft; a main clutch disposed between the internal combustion engine and the main shaft; a first motor gear disposed to be raced with respect to a motor output shaft connected to the motor, and constantly interlocked with the main shaft; a second motor gear disposed to be raced with respect to the motor output shaft, and constantly interlocked with the counter shaft; a motor dog clutch arranged to selectively engage one of the first and second motor gears with the motor output shaft; and a controller configured to control actuations of the shift dog clutch, the main clutch, and the motor dog clutch.

9 Claims, 19 Drawing Sheets

(51) Int. Cl.
*B60K 6/48* (2007.10)
*B60K 6/54* (2007.10)
*F16H 3/091* (2006.01)
*B60K 6/36* (2007.10)
*F16D 21/04* (2006.01)
*F16D 48/06* (2006.01)
*F16H 3/089* (2006.01)

(52) U.S. Cl.
CPC ..... *B60K 2006/541* (2013.01); *B60Y 2200/92* (2013.01); *B60Y 2300/42* (2013.01); *B60Y 2400/421* (2013.01); *B60Y 2400/71* (2013.01); *F16D 2500/10412* (2013.01); *F16D 2500/10462* (2013.01); *F16H 3/089* (2013.01); *F16H 2200/0052* (2013.01); *Y02T 10/626* (2013.01); *Y02T 10/6221* (2013.01); *Y02T 10/6252* (2013.01); *Y10S 903/909* (2013.01); *Y10S 903/914* (2013.01); *Y10S 903/919* (2013.01); *Y10S 903/946* (2013.01)

(56) References Cited

U.S. PATENT DOCUMENTS

| | | | |
|---|---|---|---|
| 8,635,923 B2* | 1/2014 | Misu | B60K 6/547 74/325 |
| 8,931,371 B2* | 1/2015 | Xie | B60K 6/48 74/665 A |
| 9,358,873 B2* | 6/2016 | Moore | F16H 3/089 |
| 9,834,083 B2* | 12/2017 | Blessing | B60K 6/42 |
| 2002/0040818 A1* | 4/2002 | Maruyama | B60K 6/48 180/65.25 |
| 2005/0032598 A1 | 2/2005 | Hanyu et al. | |
| 2012/0186392 A1 | 7/2012 | Lethbridge et al. | |

FOREIGN PATENT DOCUMENTS

| | | |
|---|---|---|
| JP | 2002-114048 A | 4/2002 |
| JP | 2005-54938 A | 3/2005 |
| JP | 2010-095066 A | 4/2010 |
| JP | 2011-235748 A | 11/2011 |
| WO | WO-2011/000345 A1 | 1/2011 |

* cited by examiner

TRANSMISSION DEVICE FOR HYBRID VEHICLE

BACKGROUND OF THE INVENTION

The present invention relates to a transmission device for a hybrid vehicle including a motor and an internal combustion engine which are driving sources, and more specifically to an automatic shift manual transmission device (AMT) constituted based on a manual transmission, and arranged to automate shift operation.

Conventionally, there is known an automatic shift manual transmission device which is constituted based on a manual transmission having a high transmitting efficiency, and in which a shift operation is automated. In this transmission device, when a main clutch between an internal combustion engine and the transmission device is released (disengaged) for the shift, a power transmission between the internal combustion engine and the transmission device is shut off. Accordingly, a temporal drop (decrease) of the torque is generated.

A Japanese Patent Application Publication No. 2005-54938 discloses an automatic shift manual transmission device which is applied to a hybrid vehicle using an internal combustion engine and a motor, which is arranged to perform a torque assist by the motor at the shift, and thereby to avoid the temporal drop (decrease) of the torque at the shift.

SUMMARY OF THE INVENTION

However, in the transmission device of the above-described patent document, a second input shaft connected to the motor and a first input shaft connected to the internal combustion engine are arranged to be connected with each other through a multiple plate clutch. Accordingly, a structure of the transmission device is complicated. Moreover, a variable control of a transmission capacity of the multiple plate clutch is needed. Consequently, the control is complicated.

Besides, in this configuration in which the multiple plate clutch is needed, it is difficult to bring the transmission device to a structure for a hybrid system without varying a base design of the manual transmission which is a base.

Furthermore, a gear provided to the second input shaft constitutes a part of a shift gear row constituting a low shift stage. Accordingly, the shift gear row has a three shaft configuration. Consequently, a size of the transmission device is easy to be increased.

It is, therefore, an object of the present invention to provide a transmission device for a hybrid vehicle designed to solve the above-mentioned problems.

According to one aspect of the present invention, A transmission device for a hybrid vehicle including a motor and an internal combustion engine which serve as driving sources, the transmission device comprises: a main shaft; a counter shaft; a plurality of shift gear rows each including a fixed side gear fixed on one of the main shaft and the counter shaft, and a movable side gear disposed to be raced with respect to the other of the main shaft and the counter shaft, and each constituting one of a plurality of shift stages; a plurality of shift dog clutches each arranged to selectively engage the movable side gear of one of the shift gear rows with the other of the main shaft and the counter shaft; a main clutch disposed between the internal combustion engine and the main shaft; a first motor gear disposed to be raced with respect to a motor output shaft connected to the motor, and constantly interlocked with the main shaft; a second motor gear disposed to be raced with respect to the motor output shaft, and constantly interlocked with the counter shaft; a motor dog clutch arranged to selectively engage one of the first motor gear and the second motor gear with the motor output shaft; and a controller configured to control actuations of the shift dog clutch, the main clutch, and the motor dog clutch.

DETAILED DESCRIPTION OF THE INVENTION

Hereinafter, embodiments according to the present invention are illustrated with reference to the drawings.

Figure 1:
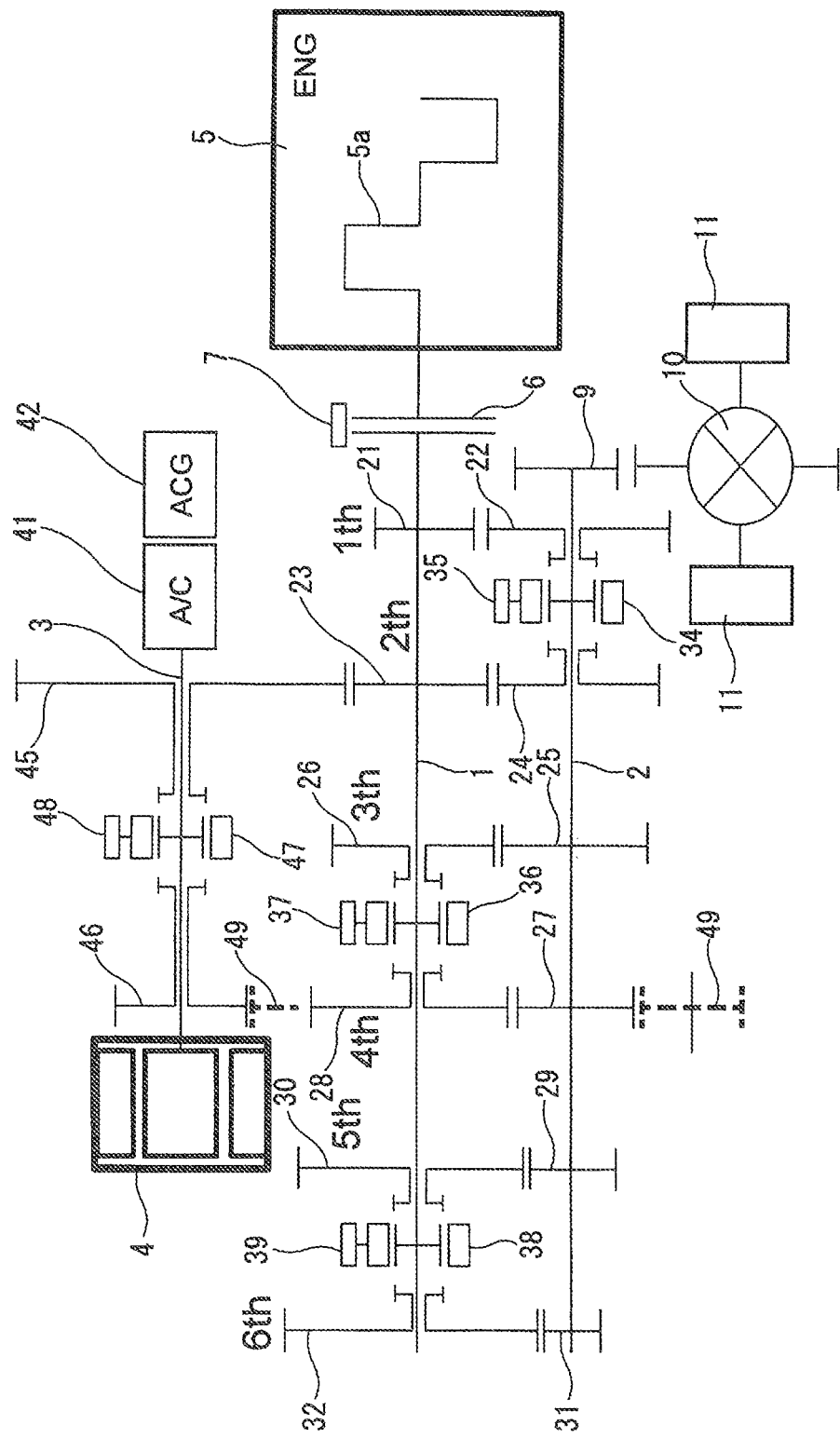
FIG. 1 is a skeleton diagram showing a transmission device according to a first embodiment of the present invention.
Figure 2:
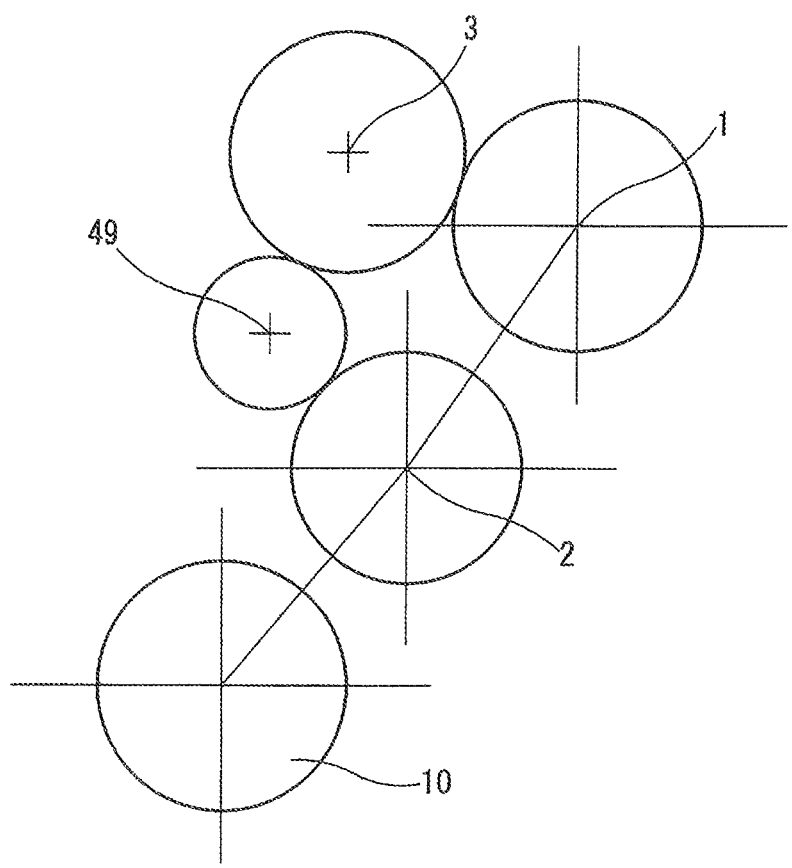
FIG. 2 is an explanation view showing dispositions of parts of the transmission device of FIG. 1 when viewed from an axial direction.

FIG. 1 is a skeleton diagram showing a transmission device for a hybrid vehicle according to a first embodiment of the present invention. FIG. 2 shows layout of portions of the transmission device when viewed from an axial direction.

This transmission device is an automatic shift manual transmission device which is constituted based on a two-shaft manual transmission, and which is arranged to automate a shift operation in the two-shaft manual transmission. The transmission device includes a main shaft 1; a counter shaft 2 extending parallel to the main shaft 1; and a motor output shaft 3 extending parallel to the main shaft 1 and the counter shaft 2. Moreover, a motor 4 is coaxially connected to an end portion of the motor output shaft 3. The motor 4 is arranged to be driven through an inverter as described later.

The main shaft 1 is disposed coaxially with a crank shaft 5a of an internal combustion engine 5. A main clutch 6 is disposed between the main shaft 1 and the internal combustion engine 5. The main clutch 6 is arranged to transmit and shut off a power from the internal combustion engine 5. This main clutch 6 is constituted by a general frictional clutch. The main clutch 6 is provided with a main clutch actuator 7 which is constituted by a motor and a solenoid, and which is actuated to engage and disengage the main clutch 6 by a control signal.

A speed reduction gear 9 is fixed at an end portion of the counter shaft 2. The counter shaft 2 is arranged to transmit the power through this speed reduction gear 9 and a differential device 10 to left and right driving wheels 11. Besides, the transmission device in this embodiment has a structure used in an FF type (front engine/front drive) vehicle including the transverse engine. An axle of the driving wheels 11 extend substantially parallel to the main shaft 1 and so on. Besides, the present invention is applicable to vehicles of other types such as FR type. The structure from the counter shaft 2 to the driving wheels 11 is not limited to the structure in this embodiment.

A plurality of shift gear rows each constituting one of a plurality of shift stages are disposed between the main shaft 1 and the counter shaft 2. In particular, a first speed fixed side gear 21 is fixed on the main shaft 1. A first speed movable side gear 22 is disposed to be raced (freely rotated) with respect to the counter shaft 2. The first speed fixed side gear 21 and the first speed movable side gear 22 are engaged with each other. The first speed fixed side gear 21 and the first speed movable side gear 22 constitute a first speed having a largest speed reduction ratio. Similarly, a second speed fixed side gear 23 is fixed on the main shaft 1. A second speed movable side gear 24 is disposed to be raced (freely rotated) with respect to the counter shaft 2. The second speed fixed side gear 23 and the second speed movable side gear 24 are engaged with each other. The second speed fixed side gear 23 and the second speed movable side gear 24 constitute a second speed.

A third speed fixed side gear 25 is fixed on the counter shaft 2. A third speed movable side gear 26 is disposed on to be raced (freely rotated) with respect to the main shaft 1. The third speed fixed side gear 25 and the third speed movable side gear 26 are engaged with each other. The third speed fixed side gear 25 and the third speed movable side gear 26 constitute a third speed. Similarly, a fourth speed fixed side gear 27 is fixed on the counter shaft 2. A fourth speed movable side gear 28 is disposed to be raced (freely rotated) with respect to the main shaft 1. The fourth speed fixed side gear 27 and the fourth speed movable side gear 28 are engaged with each other. The fourth speed fixed side gear 27 and the fourth speed movable side gear 28 constitute a fourth speed. A fifth speed fixed side gear 29 is fixed on the counter shaft 2. A fifth speed movable side gear 30 is disposed to be raced (freely rotated) with respect to the main shaft 1. The fifth speed fixed side gear 29 and the fifth speed movable side gear 30 are engaged with each other. The fifth speed fixed side gear 29 and the fifth speed movable side gear 30 constitute a fifth speed. A sixth speed fixed side gear 31 is fixed on the counter shaft 2. A sixth speed movable side gear 32 is disposed to be raced (freely rotated) with respect to the main shaft 1. The sixth speed fixed side gear 31 and the sixth speed movable side gear 32 are engaged with each other. The sixth speed fixed side gear 31 and the sixth speed movable side gear 32 constitute a sixth speed.

A 1st-2nd speed shift dog clutch 34 is disposed on the counter shaft 2 between the first speed movable side gear 22 and the second speed movable side gear 24. The 1st-2nd speed shift dog clutch 34 is arranged to selectively engage the first speed movable side gear 22 or the second speed movable side gear 24 with the counter shaft 2. This 1st-2nd speed shift dog clutch 34 is provided with a 1st-2nd speed clutch actuator 35 which includes a motor, a solenoid, and so on, and which is arranged to shift the 1st-2nd speed shift dog clutch 34 to three positons including a neutral positon, by a control signal. By operating the 1st-2nd speed shift dog clutch 34 through the 1st-2nd speed clutch actuator 35, the shift between the first speed and the second speed is performed. Besides, the 1st-2nd speed shift dog clutch 34 is preferable to be provided with a synchronism mechanism, if necessary.

A 3rd-4th speed shift dog clutch 36 is disposed on the main shaft 1 between the third speed movable side gear 26 and the fourth speed movable side gear 28. The 3rd-4th speed shift dog clutch 36 is arranged to selectively engage the third speed movable side gear 26 or the fourth speed movable side gear 28 with the main shaft 1. The 3rd-4th speed shift dog clutch 36 is provided with a 3rd-4th speed clutch actuator 37 which includes a motor, a solenoid, and so on, and which is arranged to shift the 3rd-4th speed shift dog clutch 36 to three positons including a neutral positon, by a control signal. By operating the 3rd-4th speed shift dog clutch 36 through the 3rd-4th speed clutch actuator 37, the shift between the third speed and the fourth speed is performed.

Similarly, a 5th-6th speed shift dog clutch 38 with a 5th-6th speed clutch actuator 39 is disposed on the main shaft 1 between the fifth speed movable side gear 30 and the sixth speed movable side gear 32. With these, the shift between the fifth speed and the sixth speed is performed.

The 3rd-4th speed shift dog clutch 36 and the 5th-6th speed shift dog clutch 38 are preferable to be provided, respectively, with synchronism mechanisms, if necessary.

These shift gear rows basically have a configuration identical to that of a general manual transmission. In this embodiment, the fixed side gears 21 and 23 of the first speed and the second speed are fixed on the main shaft 1. The fixed side gears 25, 27, 29, and 31 of the third speed, the fourth speed, the fifth speed, and the sixth speed are fixed on the counter shaft 2.

A compressor 41 for an air conditioner, a generator (alternator) 42 for electric equipment, and so on which are auxiliary equipment (accessories) are directly connected or connected through an interlocking system (not shown) to the other end of the motor output shaft 3 having the one end connected to the motor 4. Besides, the generator 42 is for charging a low voltage battery (not shown) for the electric equipment.

Moreover, a first motor gear 45 and a second motor gear 46 are disposed to be raced (freely rotated) with respect to the motor output shaft 3. A motor dog clutch 47 is disposed on the motor output shaft 3 between the first motor gear 45 and the second motor gear 46. The motor dog clutch 47 is arranged to selectively engage the first motor gear 45 and the second motor gear 46 with the motor output shaft 3. This motor dog clutch 47 has three positions including a neutral position. The motor dog clutch 47 is provided with a motor clutch actuator 48 which includes a motor, a solenoid, and so on, and which is arranged to shift the motor dog clutch 47 to one of the three positions, by a control signal. Besides, the motor dog clutch 47 is preferable to be provided with a synchronism mechanism, if necessary.

The first motor gear 45 is engaged with the second speed fixed side gear 23 fixed on the main shaft 1. Accordingly, the first motor gear 45 and the main shaft 1 are constantly interlocked with each other, so as to rotate as a unit with each other by a predetermined gear ratio.

Furthermore, the second motor gear 46 is engaged with an idler gear 49 arranged to inverse the rotation direction. This idler gear 49 is engaged with the fourth speed fixed side gear 27 fixed on the counter shaft 2. Accordingly, the second motor gear 46 and the counter shaft 2 are constantly interlocked with each other, so as to rotate as a unit with each other by a predetermined gear ratio.

Therefore, in a case where the motor dog clutch 47 is engaged with the first motor gear 45, it is possible to drive and rotate the main shaft 1 by the motor 4. In a case where the motor dog clutch 47 is engaged with the second motor gear 46, it is possible to drive and rotate the counter shaft 2 by the motor 4. In this case, as is evident from FIG. 2, the first motor gear 45 and the main shaft 1 are arranged to be rotated in opposite directions. On the other hand, the second motor gear 46 and the counter shaft 2 are arranged to be rotated in the same direction for the idler gear 49. Moreover, the main shaft 1 and the counter shaft 2 are arranged to be rotated in the opposite directions by the shift gear rows (21 to 32) for the shift stages. Accordingly, there is consistency in a relationship among the rotation direction of the motor 4, the rotation direction of the main shaft 1, and the rotation direction of the counter shaft 2.

Figure 10:
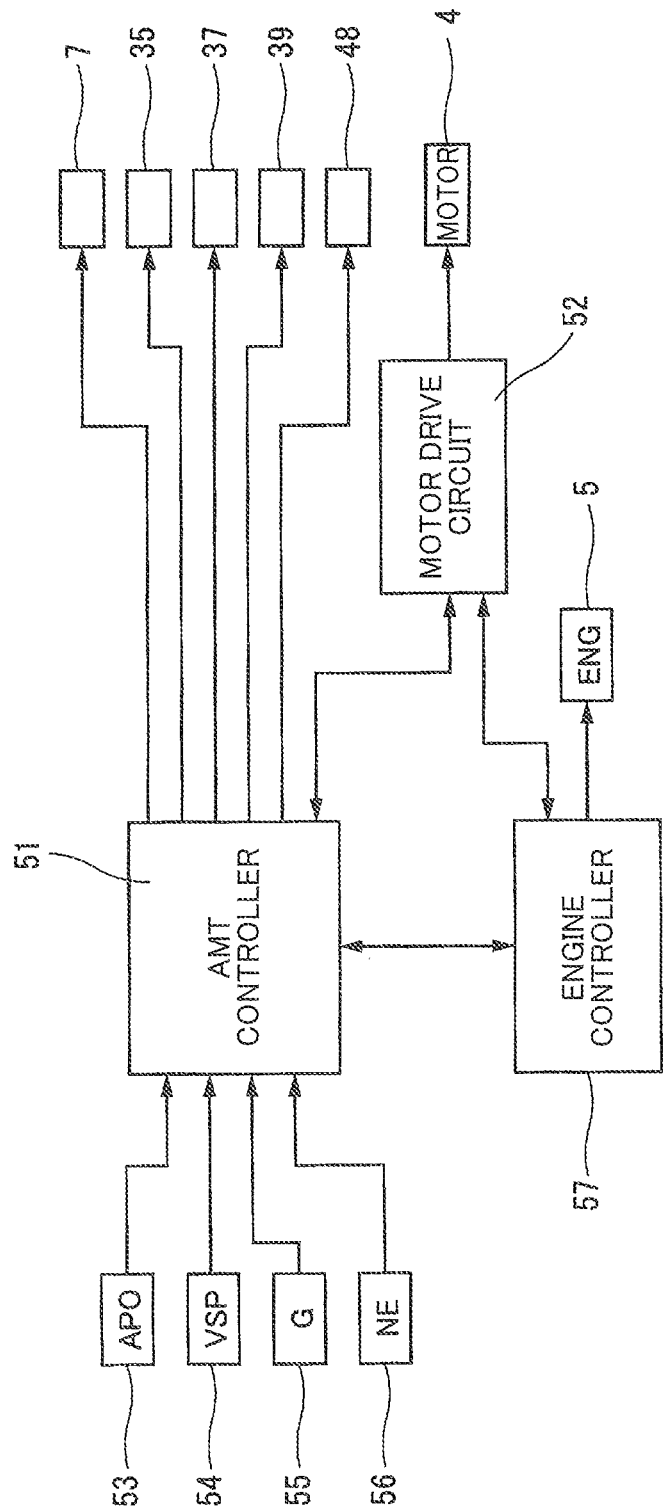
FIG. 10 is a configuration explanation view showing a configuration of a control device of the transmission device.

FIG. 10 is a configuration explanation view showing a system configuration of a control device configured to control the thus-constructed transmission device. An AMT controller 51 which is a controller (control section) controls the main clutch actuator 7 arranged to actuate the main clutch 6, the 1st-2nd speed clutch actuator 35 arranged to actuate the shift dog clutch 34, the 3rd-4th speed clutch actuator 37 arranged to actuate the shift dog clutch 36, the 5th-6th speed clutch actuator 39 arranged to actuate the shift dog clutch 38, and the motor clutch actuator 48 arranged to actuate the motor dog clutch 47. The motor 4 is controlled by a motor drive circuit 52 including the inverter. The motor drive circuit 52 is configured to receive a signal from the AMT controller 51, and to output a signal to the AMT controller 51. Moreover, the motor drive circuit 52 is configured to interchange the signals from and to the engine controller 57 by the mutual information communication of the internal combustion engine 5. Besides, the motor 4 is arranged to be controlled to the power traveling state and the regeneration state. The AMT controller 51 receives detection signals of an accelerator opening degree sensor 53, a vehicle speed sensor 54, a vehicle acceleration sensor 55, an engine speed sensor 56 arranged to sense a rotation speed of the internal combustion engine 5, as signals indicative of a request of the driver and driving states of the vehicle. The internal combustion engine 5 is controlled by the engine controller 57. The AMT controller 51 and the engine controller 57 are connected with each other through CAN communication and so on to interchange the signals.

Besides, the motor drive circuit 52 may be integrated with the AMT controller 51. Moreover, the motor drive circuit 52 may be installed within the AMT controller 51.

Next, controls and operations in various cases of the transmission device are explained with reference to FIG. 3 to FIG. 9. Besides, in FIG. 3 to FIG. 9, each of arrows M represents a flow of the torque of the motor 4. Each of arrows E represents a flow of the torque of the internal combustion engine 5. Moreover, each of arrows F and arrows R which have curved shapes represents a rotation direction of one of the main parts. When viewed from an axial direction shown in FIG. 2, for example, an arrow F represents a rotation direction of a clockwise direction, and an arrow R represents a rotation direction of a counterclockwise direction.

Figure 3:
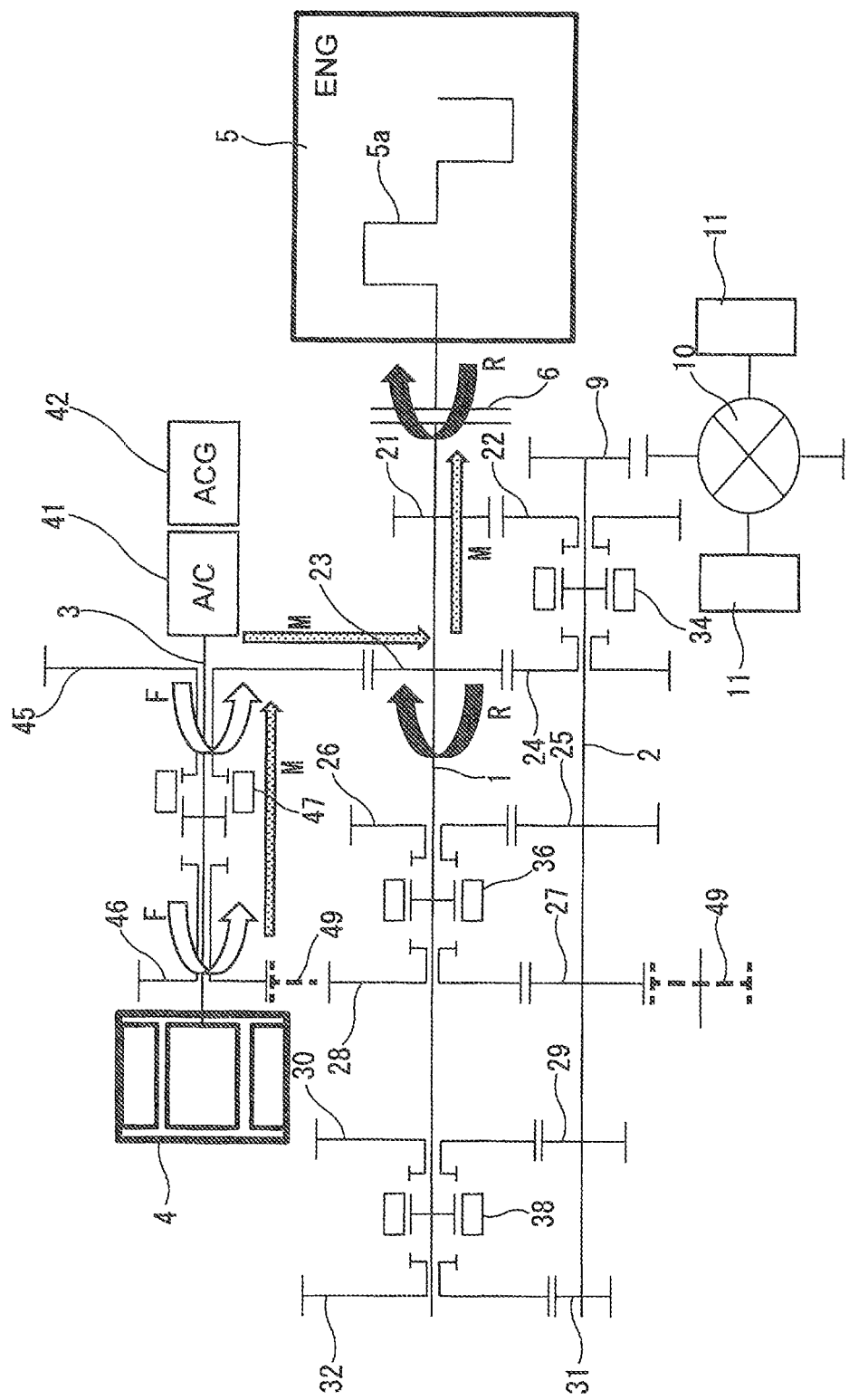
FIG. 3 is an operation explanation view at a start of an internal combustion engine.

FIG. 3 is an operation explanation view when the internal combustion engine 5 is started (cranked) by using the motor 4 in the vehicle stop state. In the vehicle stop state, the shift dog clutches 34, 36, and 38 are in the neutral positions. When the internal combustion engine 5 is started, the main clutch 6 is engaged from the above-described state. Moreover, the motor dog clutch 47 is engaged with the first motor gear 45. Then, the motor 4 is driven and rotated in a predetermined rotation direction shown by the arrow F (hereinafter, this rotation direction is referred to as a forward (normal) direction for the explanation).

Accordingly, the torque of the motor 4 is transmitted from the motor 4 through the first motor gear 45 and the second speed fixed side gear 23 to the main shaft 1, as shown by the arrows M. Moreover, the torque is provided through the main clutch 6 to the internal combustion engine 5. With this, the crank shaft 5a is cranked, so that the engine 5 is started. Besides, the main clutch 6 is once disengaged after the completion of the start of the engine, for the start of the vehicle.

Figure 4:
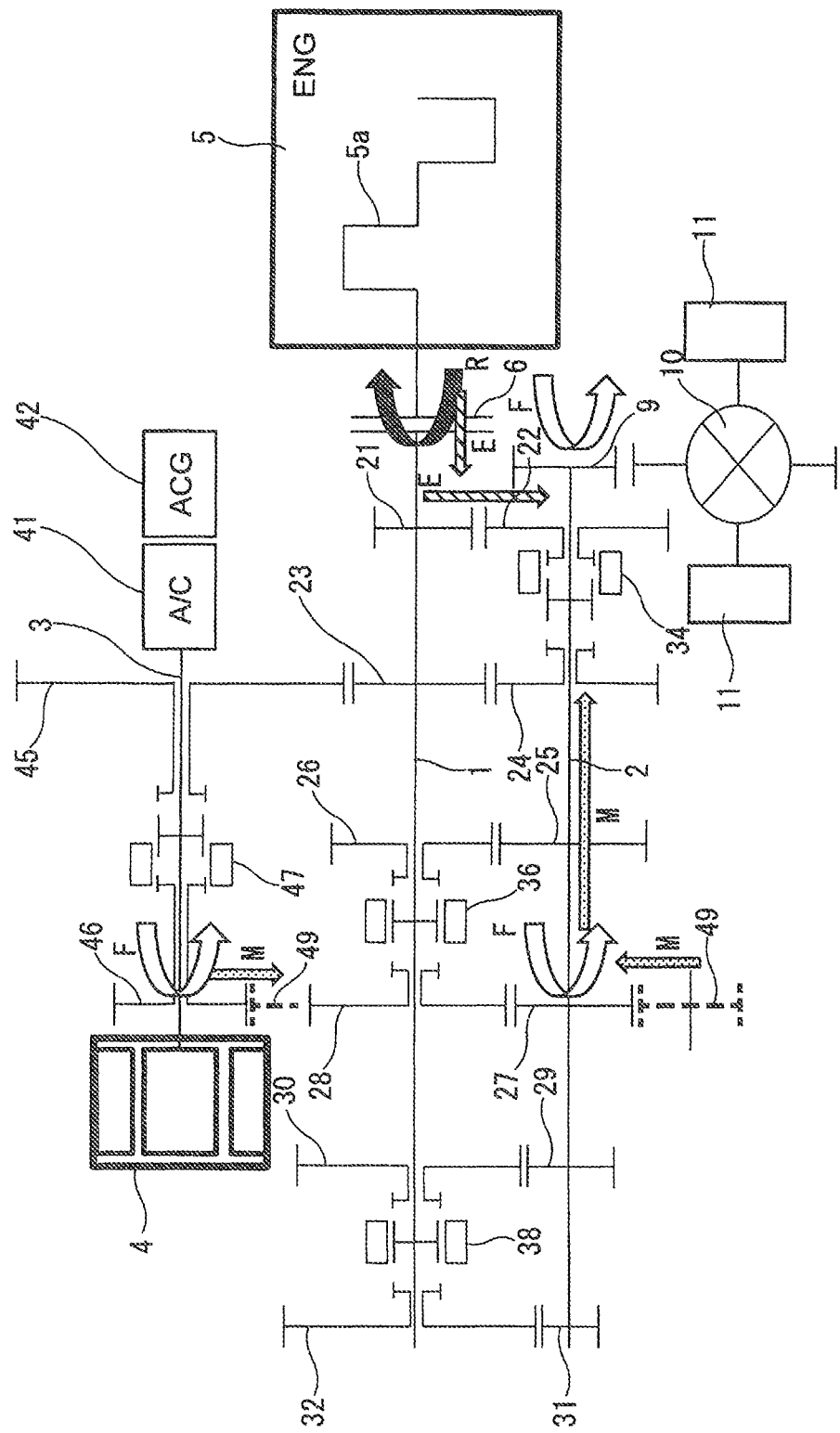
FIG. 4 is an operation explanation view at a start of a vehicle.

FIG. 4 is an operation explanation view when the vehicle is started by using the internal combustion engine 5 and the motor 4. The main clutch 6 is disengaged before the start of the vehicle. From this state, the 1st-2nd speed shift dog clutch 34 is engaged with the first speed side. The main clutch 6 which is a start clutch is gradually engaged. With this, the vehicle is started. At this time, the motor dog clutch 47 is engaged with the second motor gear 46. Then, the motor 4 is driven and rotated. With this, it is possible to perform the torque assist by the motor 4. That is, the torque of the motor 4 is transmitted from the motor 4 to the counter shaft 2 through the second motor gear 46, the idler gear 49, and the fourth speed fixed side gear 27, as shown by the arrows M. Accordingly, the torque of the internal combustion engine 5 which is represented by the arrows E, and the torque of the motor 4 which is represented by the arrows M are provided to the counter shaft 2 (that is, the driving wheels 11).

Besides, the vehicle may be started only by the internal combustion engine 5, or only by the motor 4.

Figure 5:
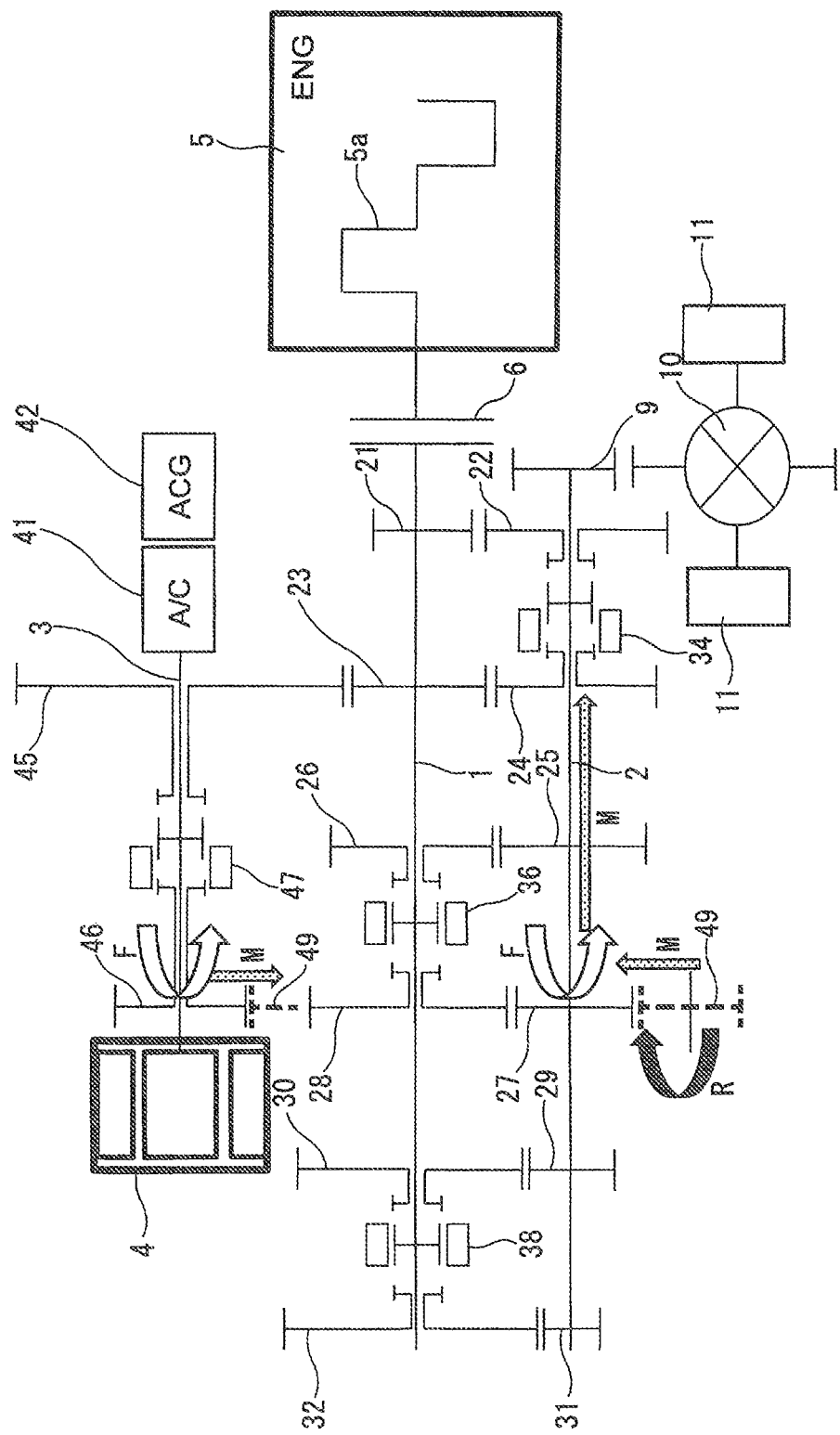
FIG. 5 is an operation explanation view at a shift.

FIG. 5 is an operation explanation view at the shift after the vehicle is started, for example, at the shift from the first speed to the second speed after the vehicle is started. At the shift, the main clutch 6 is disengaged, and the 1st-2nd speed shift dog clutch 34 is actuated to the second speed side to perform the shift. At this time, the motor dog clutch 47 is engaged with the second motor gear 46. The torque assist by the motor 4 is performed to the counter shaft 2 through the idler gear 49 and the fourth speed fixed side gear 27. With this, it is possible to avoid the temporal drop (temporal decrease) of the torque according to the disengagement of the main clutch 6 at the shift. The main clutch 6 is gradually engaged after the completion of the shift of the 1st-2nd speed shift dog clutch 34. The torque amount by the motor 4 is gradually decreased in accordance with the gradual engagement of the main clutch 6.

In this way, the torque assist is performed at the shift by using the torque of the motor 4. With this, it is possible to perform the smooth shift while suppressing the deceleration feeling at the shift. At the shift at the other shift stages such as the shift from the second speed to the third speed, the shift from the third speed to the fourth speed, it is also possible to perform the smooth shift by the torque assist. Besides, the torque assist may be omitted at the shift at the deceleration.

The above-described shift is performed by the manual operation according to selection and command of the shift stage from the driver. Moreover, the above-described shift can be also performed by an automatic shift according to the driving state (an accelerator opening degree, a vehicle speed and so on) of the vehicle.

Figure 6:
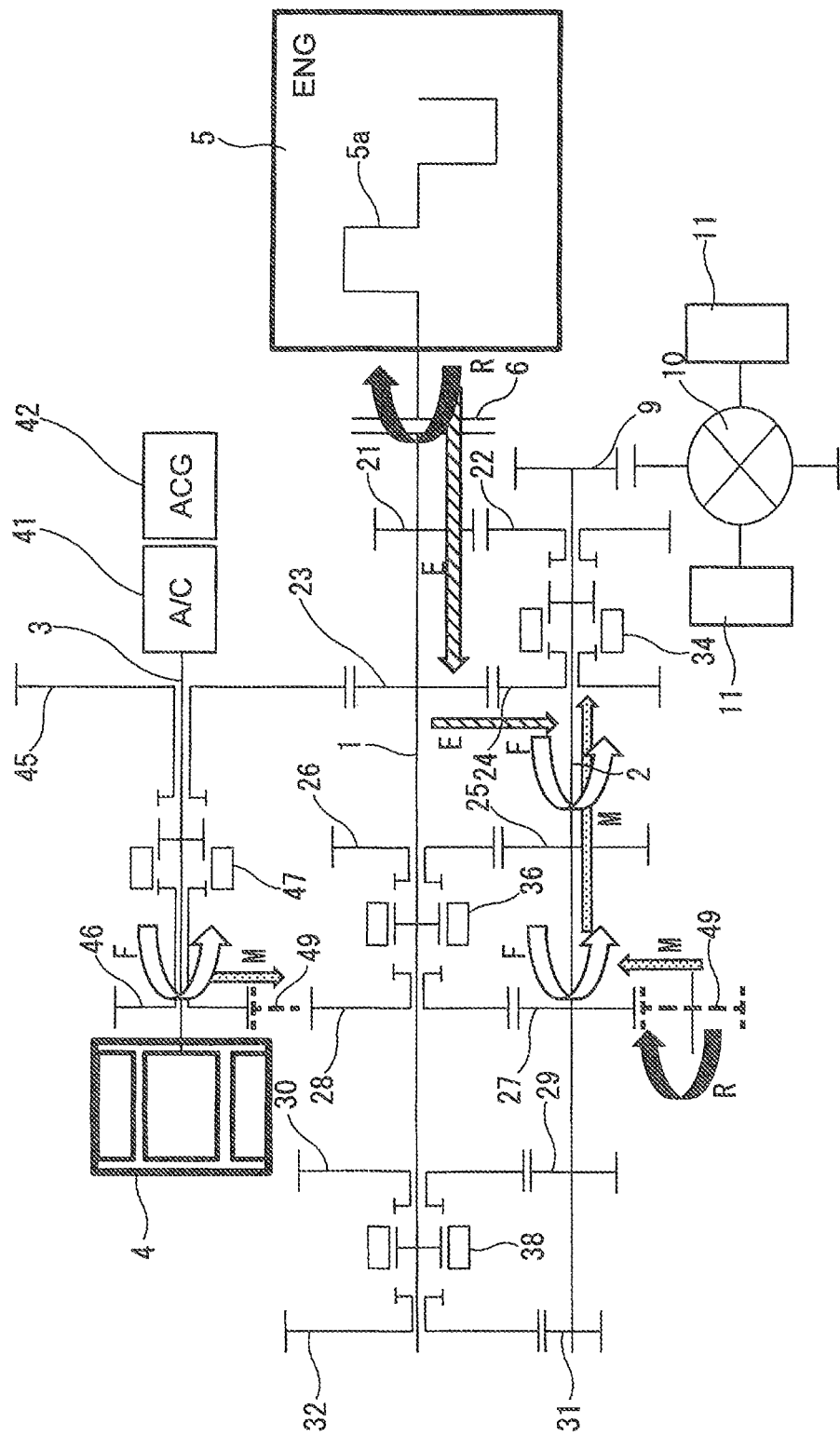
FIG. 6 is an operation explanation view at a travel of the vehicle.

FIG. 6 is an operation explanation view when the vehicle travels at the constant shift stage, for example, the second speed. In this case, the vehicle basically travels by the torque of the internal combustion engine 5. If necessary, the motor dog clutch 47 is engaged with the second motor gear 46. Moreover, the motor 4 is driven so as to perform the torque assist. Furthermore, at the deceleration of the vehicle, the torque is inputted from the counter shaft 2 through the second motor gear 46 to the motor 4. Accordingly, it is possible to perform the energy regeneration by the motor 4.

Besides, when the vehicle travels in the engagement state of the shift gear row of one of the shift stages, it is also possible to perform the torque assist and the energy regeneration from the first motor gear 45 through the main shaft 1 by engaging the motor dog clutch 47 with the first motor gear 45.

The auxiliary equipment such as the compressor 41 and the generator 42 are connected to the motor output shaft 3. Accordingly, when the motor 4 is rotated, these auxiliary equipment are driven together. In a case where the motor dog clutch 47 is brought to the neutral position, it is possible to drive the auxiliary equipment such as the compressor 41, irrespective of the states of the shift gear rows and the main clutch 6, and so on.

Figure 7:
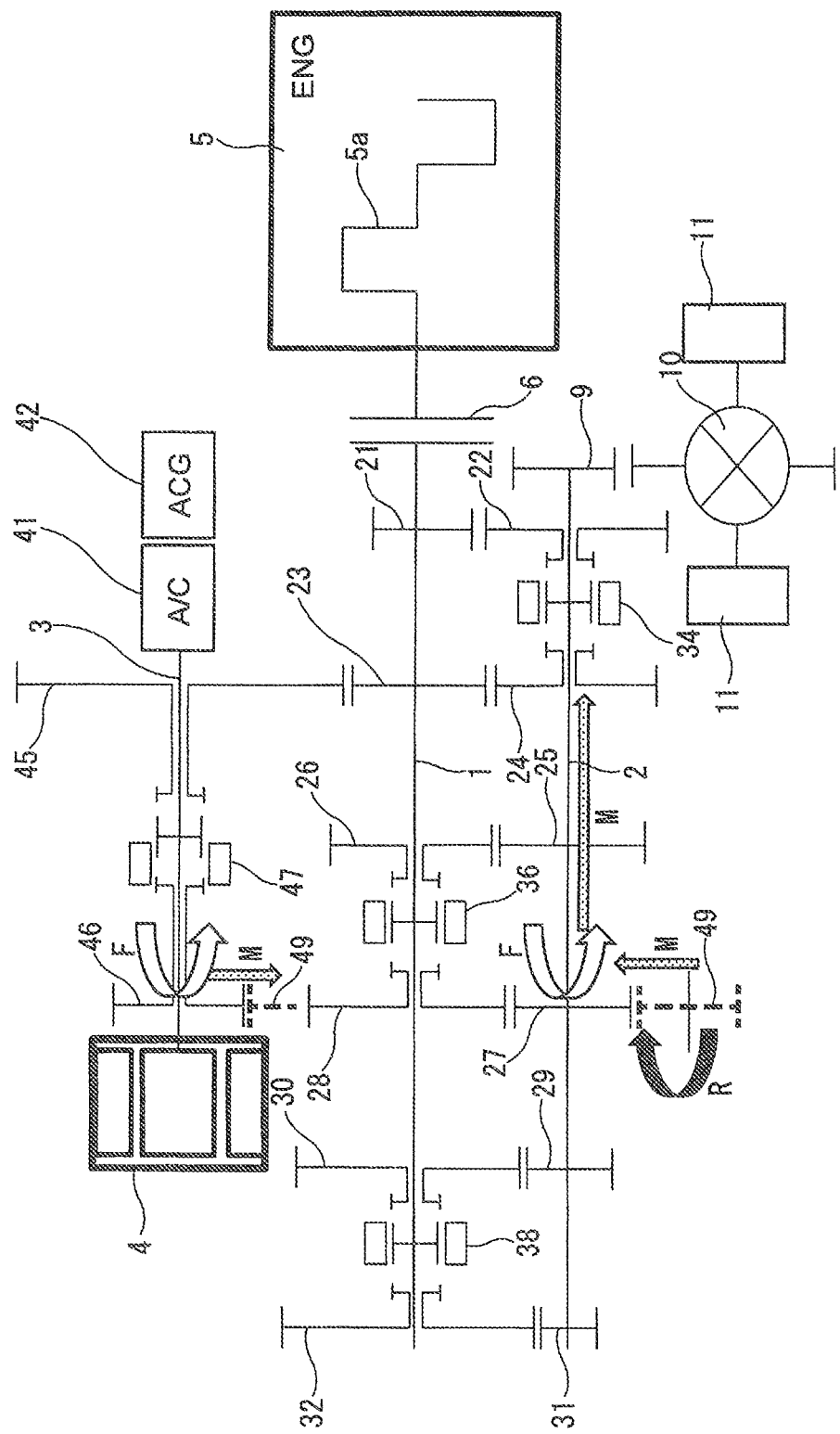
FIG. 7 is an operation explanation view at an EV travel.

FIG. 7 is an operation explanation view at an EV travel at which the vehicle travels only by the motor 4 by stopping the internal combustion engine 5. At this EV travel, the main clutch 6 is disengaged so that the transmission device is separated from the internal combustion engine 5. The motor dog clutch 47 is engaged with the second motor gear 46. The motor 4 is driven. With these, the vehicle can travel by the torque of the motor 4. Besides, the shift gear row of one of the shift stages is in the engagement state. Accordingly, the vehicle can also travel by the torque transmission from the first motor gear 45 through the main shaft 1.

Figure 8:
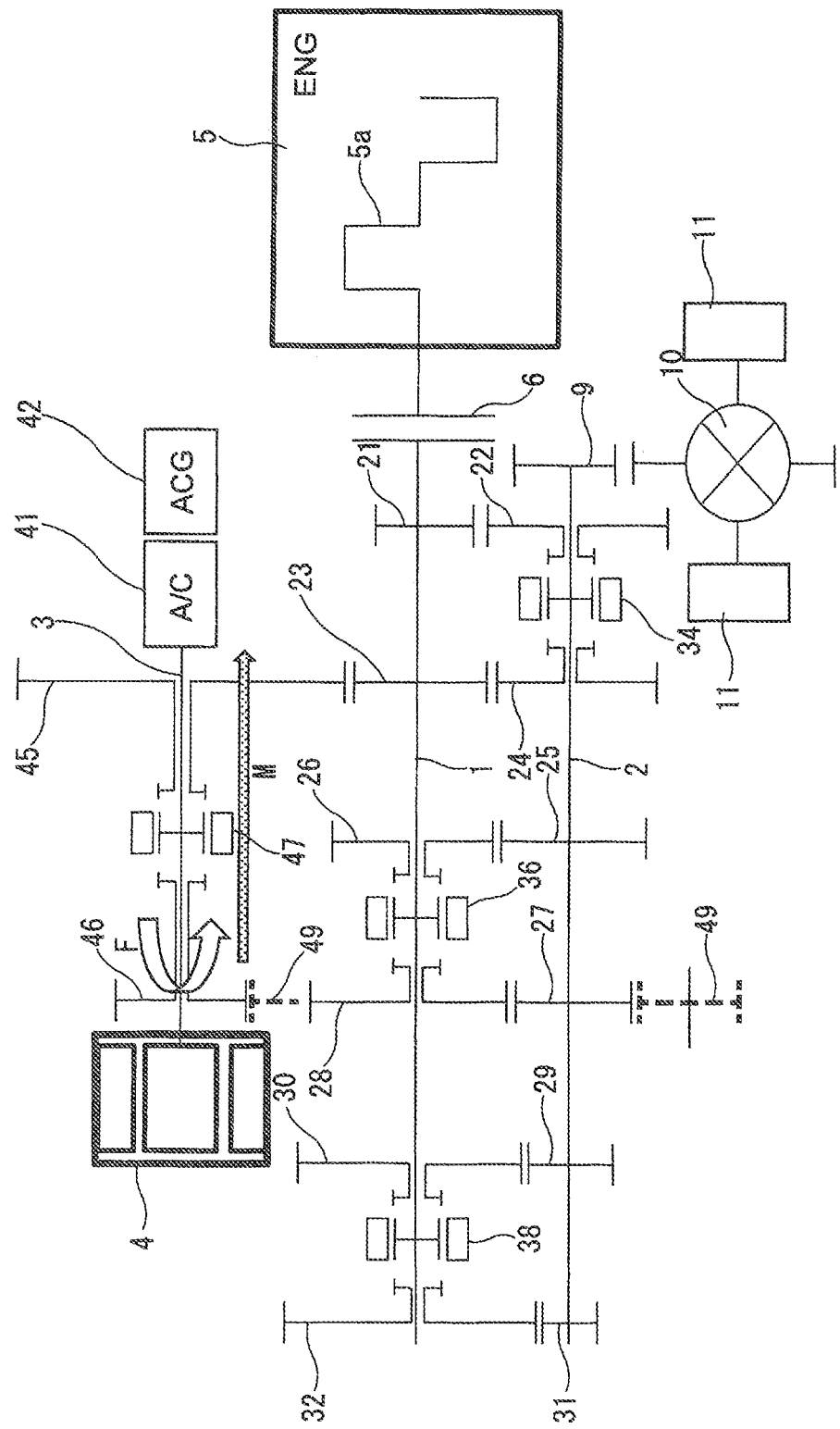
FIG. 8 is an operation explanation view when an auxiliary equipment is driven during the stop of the vehicle.

FIG. 8 is an operation explanation view when the internal combustion engine 5 is stopped as an idling stop when the vehicle is temporarily stopped. At the temporal stop of the vehicle at an intersection and so on, the main clutch 6 is disengaged, and the internal combustion engine 5 is stopped in accordance with a predetermined idling stop condition. In this state, the motor dog clutch 47 is brought to the neutral position. The motor 4 is driven. With these, it is possible to drive the auxiliary equipment such as the compressor 41 during the idling stop.

Figure 9:
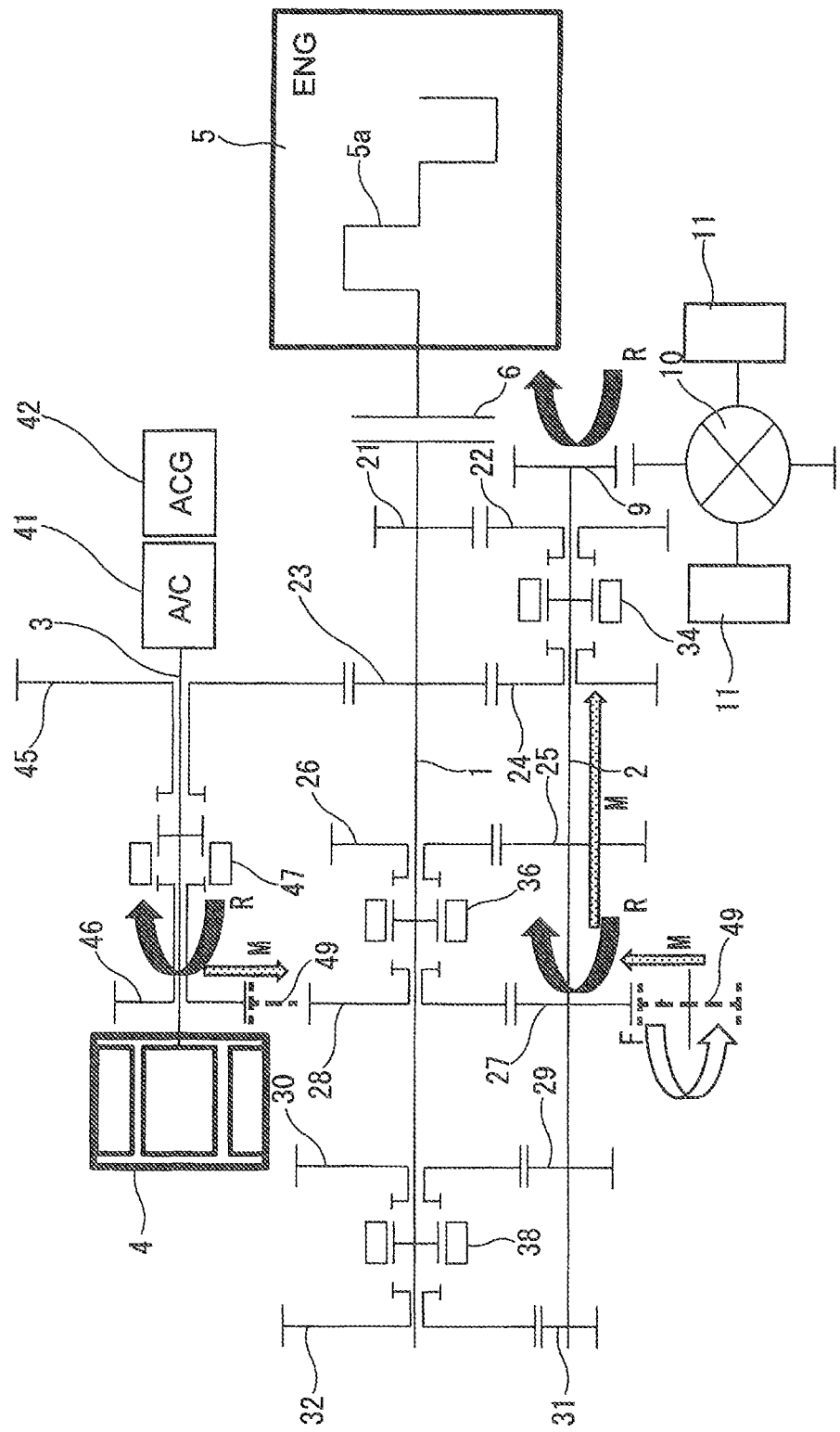
FIG. 9 is an operation explanation view at a backward travel of the vehicle.

FIG. 9 is an operation explanation view when the vehicle travels in the backward direction. The transmission device shown in the drawings does not include a gear row for the backward travel. The vehicle travels in the backward direction by reversing the motor 4. That is, the main clutch 6 is disengaged. The motor dog clutch 47 is engaged with the second motor gear 46. The motor 4 is driven in the reverse direction. With these, the counter shaft 2 is rotated in a direction opposite to the direction at the forward travel, so that the vehicle travels in the backward direction. That is, the vehicle travels in the backward direction by the torque transmission which does not pass through the shift gear row.

Besides, it is also possible to perform the backward travel by the torque transmission passing through the main shaft 1 by engaging the motor dog clutch 47 with the first motor gear 45, and by setting the shift stage, for example, to the first speed by the 1st-2nd speed shift dog clutch 34.

In this way, in the transmission device according to this embodiment, it is possible to transmit the torque from the motor 4 to the counter shaft 2 or the main shaft 1 without using the multiple plate clutch. Accordingly, it is possible to avoid complication of the structure and complication of the control by using the multiple plate clutch. In particular, it is possible to switch between the input of the torque to the counter shaft 2, and the input of the torque to the main shaft 1, by switching the motor dog clutch 47. Consequently, it is possible to add the torque assist at the shift without passing through the shift gear row, and to crank at the start of the internal combustion engine 5.

Moreover, the transmission device is basically the two-shaft manual transmission mechanism including the main shaft 1 and the counter shaft 2, except for the motor 4 and the motor output shaft 3. Accordingly, it is possible to minimize the size increase of the transmission device due to the addition of the motor 4, and to bring the transmission device to a structure for a hybrid system by using a basic design of the manual transmission which is the base structure.

Furthermore, it is possible to drive the auxiliary equipment such as the compressor 41 during the stop of the vehicle in which the internal combustion engine 5 is stopped.

Figure 11:
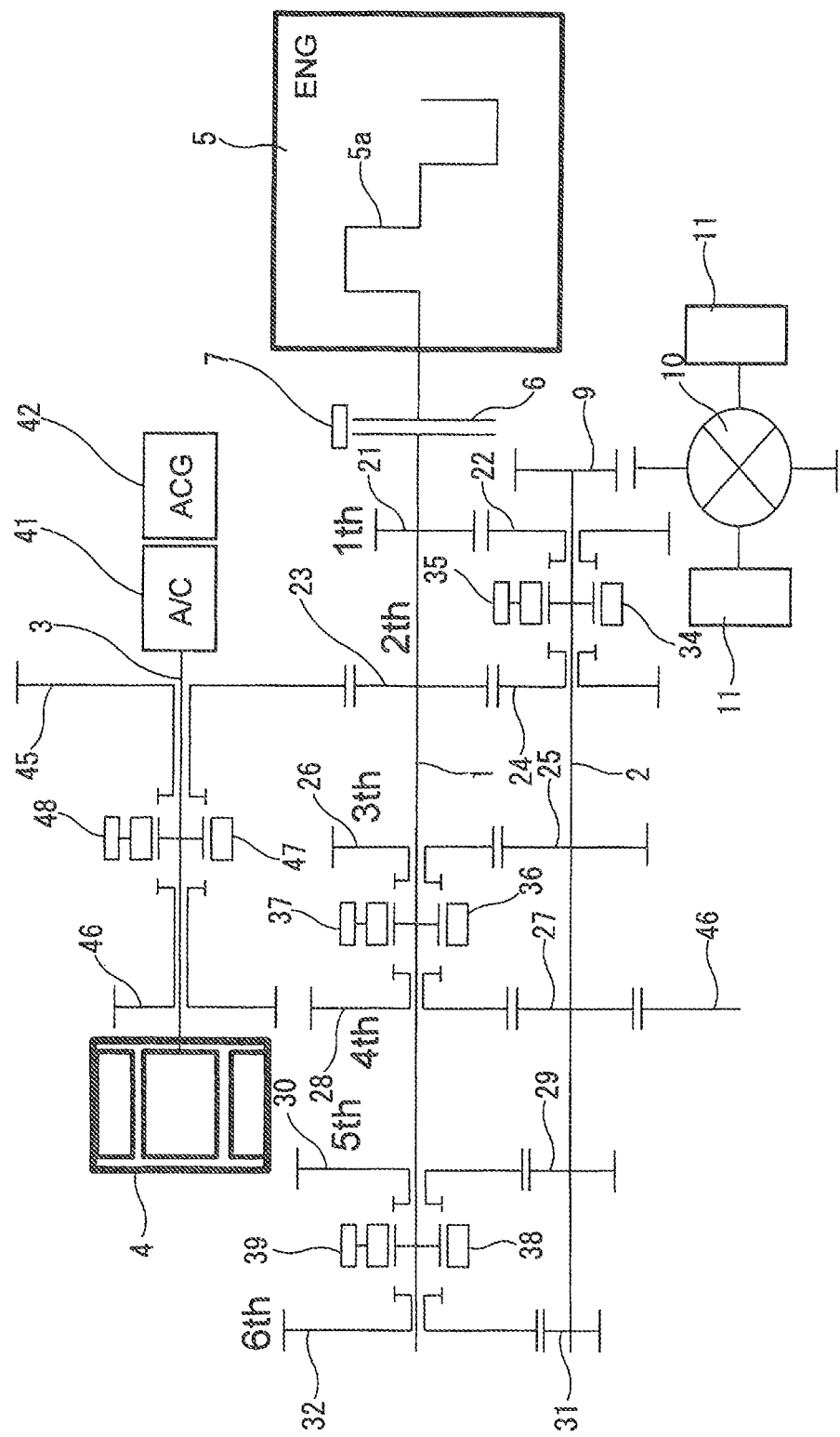
FIG. 11 is a skeleton diagram showing a transmission device according to a second embodiment of the present invention.
Figure 12:
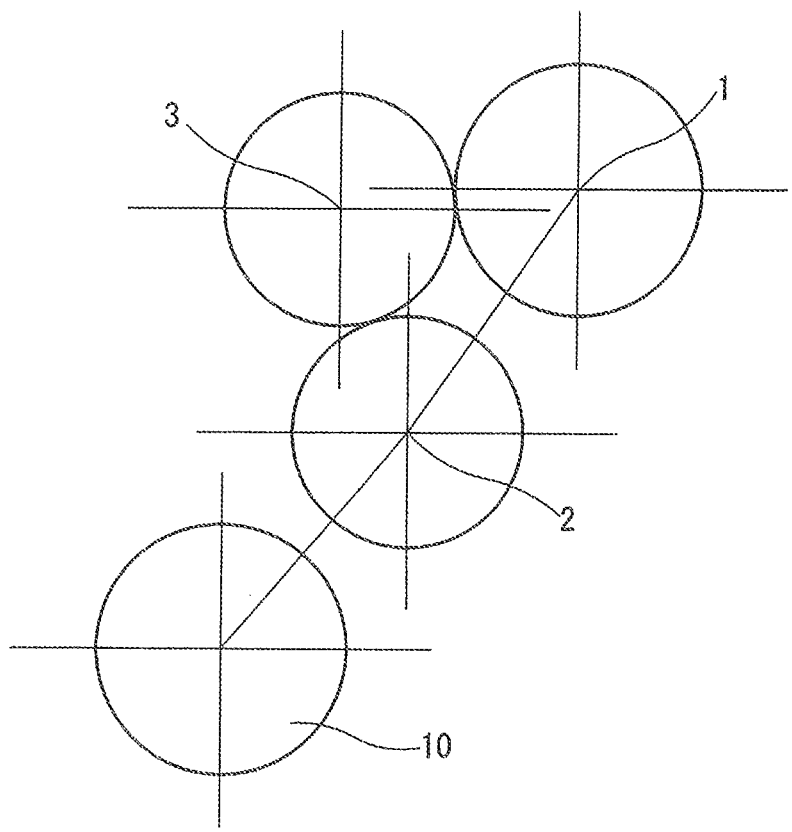
FIG. 12 is an explanation view showing dispositions of parts of the transmission device of FIG. 11 when viewed from an axial direction.

Next, FIG. 11 and FIG. 12 show a transmission device according to a second embodiment of the present invention. In this second embodiment, the transmission device does not include the idler gear 49 in the first embodiment. The second motor gear 46 on the motor output shaft 3 is directly engaged with the fourth speed fixed side gear 27 fixed on the counter shaft 2. Accordingly, as is evident from FIG. 12, when the motor 4 is rotated in one direction, the rotation direction of the main shaft 1 interlocked with the motor 4 through the first motor gear 45 becomes identical to the rotation direction of the counter shaft 2 interlocked with the motor 4 through the second motor gear 46.

Therefore, in a case where the torque assist and so on is performed by passing through the second motor gear 46 when the vehicle travels in the forward direction, the motor 4 is driven in the reverse direction.

FIG. 13 to FIG. 19 are operation explanation views in the second embodiment. FIG. 13 to FIG. 19 correspond to FIG. 3 to FIG. 9 which explain the operations in the first embodiment. Controls and operations shown in FIG. 13 to FIG. 19 in the second embodiment are substantially identical to those in the first embodiment. Accordingly, the detailed explanations are omitted.

Figure 13:
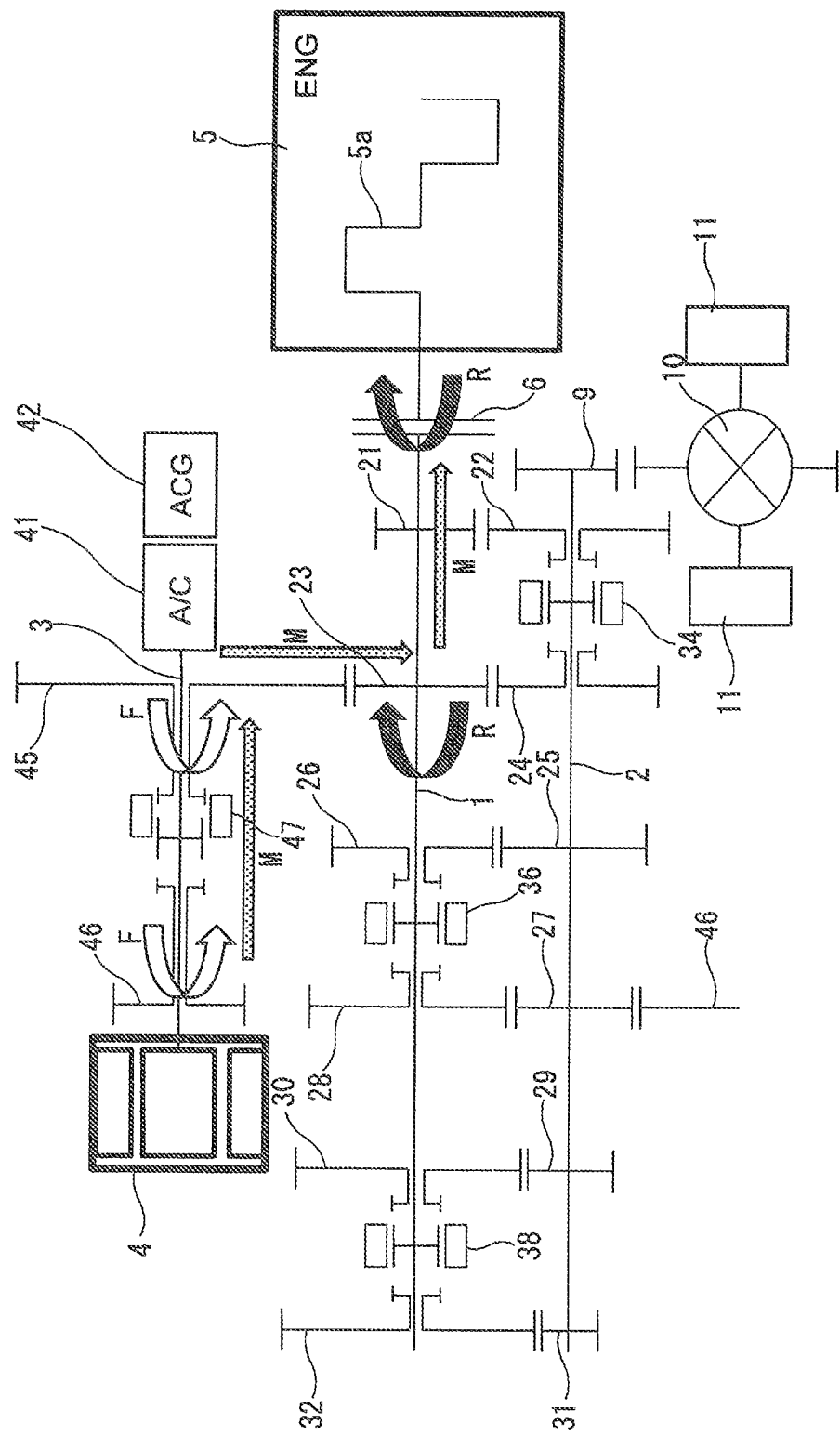
FIG. 13 is an operation explanation view at a start of an internal combustion engine in the second embodiment.

FIG. 13 is an operation explanation view at the start of the internal combustion engine 5, like FIG. 3. At this start of the internal combustion engine 5, the torque of the motor 4 is transmitted through the first motor gear 45 to the internal combustion engine 5. Accordingly, the rotation direction of the motor 4 is the forward direction, like the first embodiment.

Figure 14:
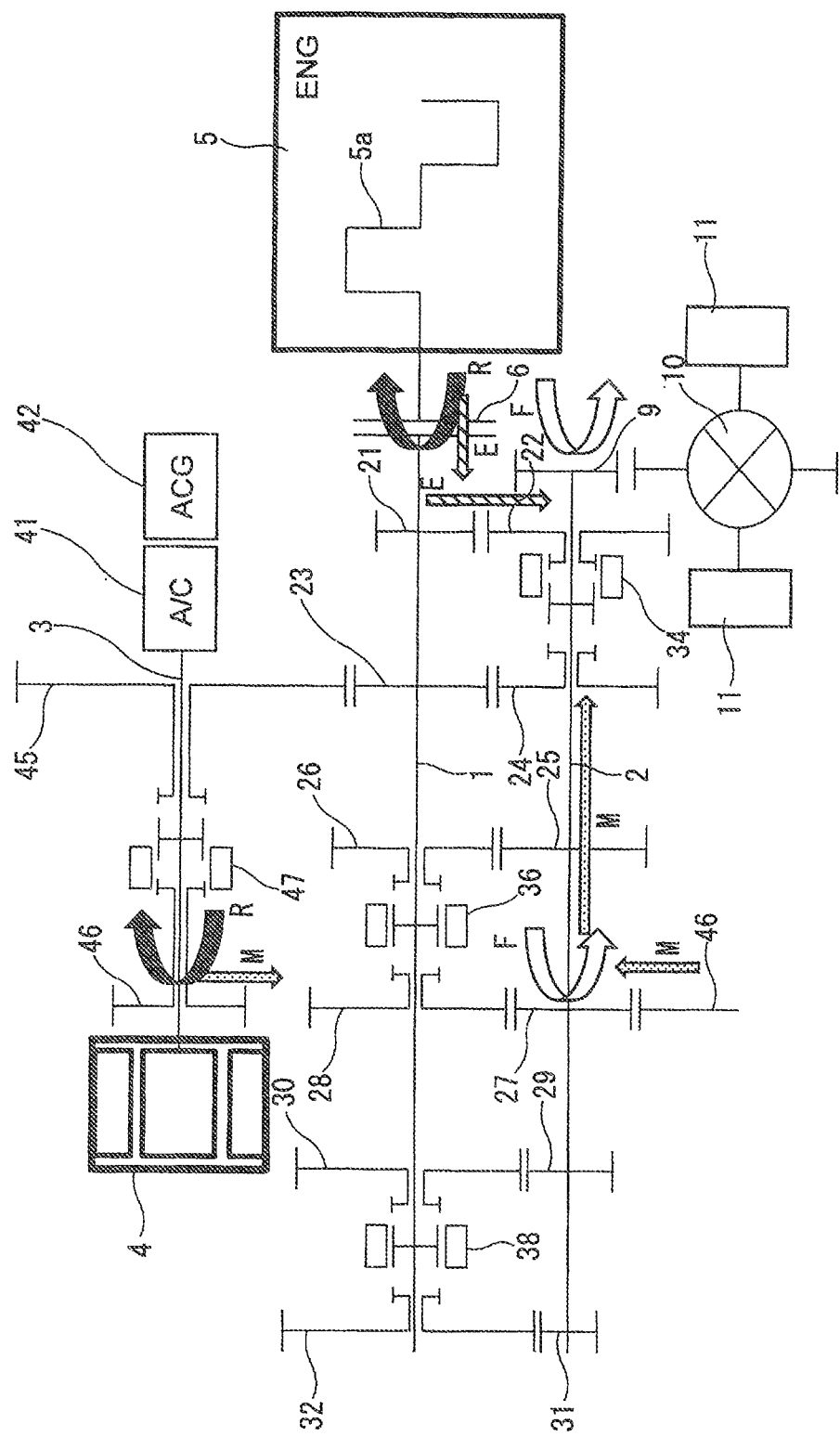
FIG. 14 is an operation explanation view at a start of a vehicle.
Figure 15:
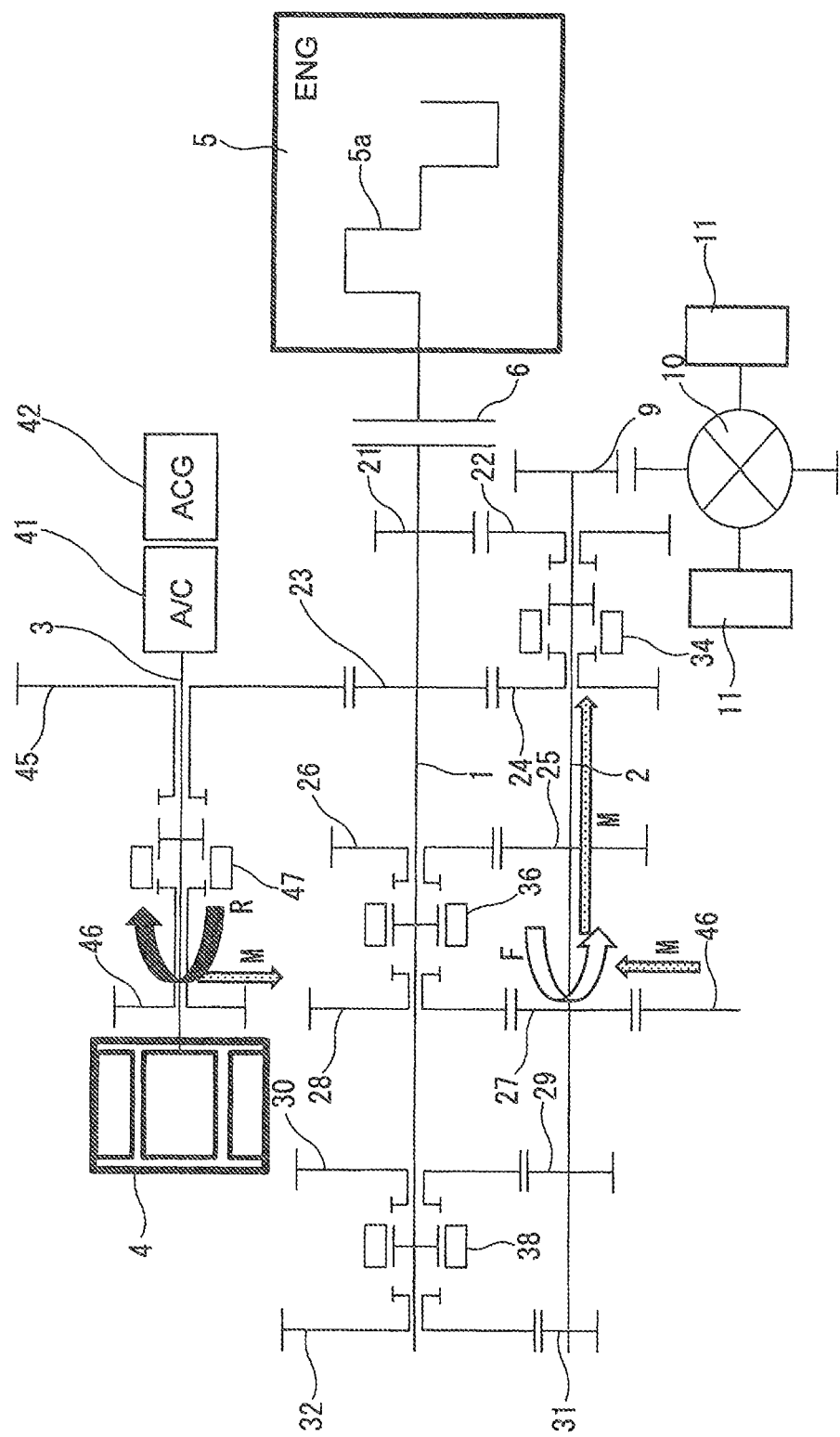
FIG. 15 is an operation explanation view at a shift of a vehicle.
Figure 16:
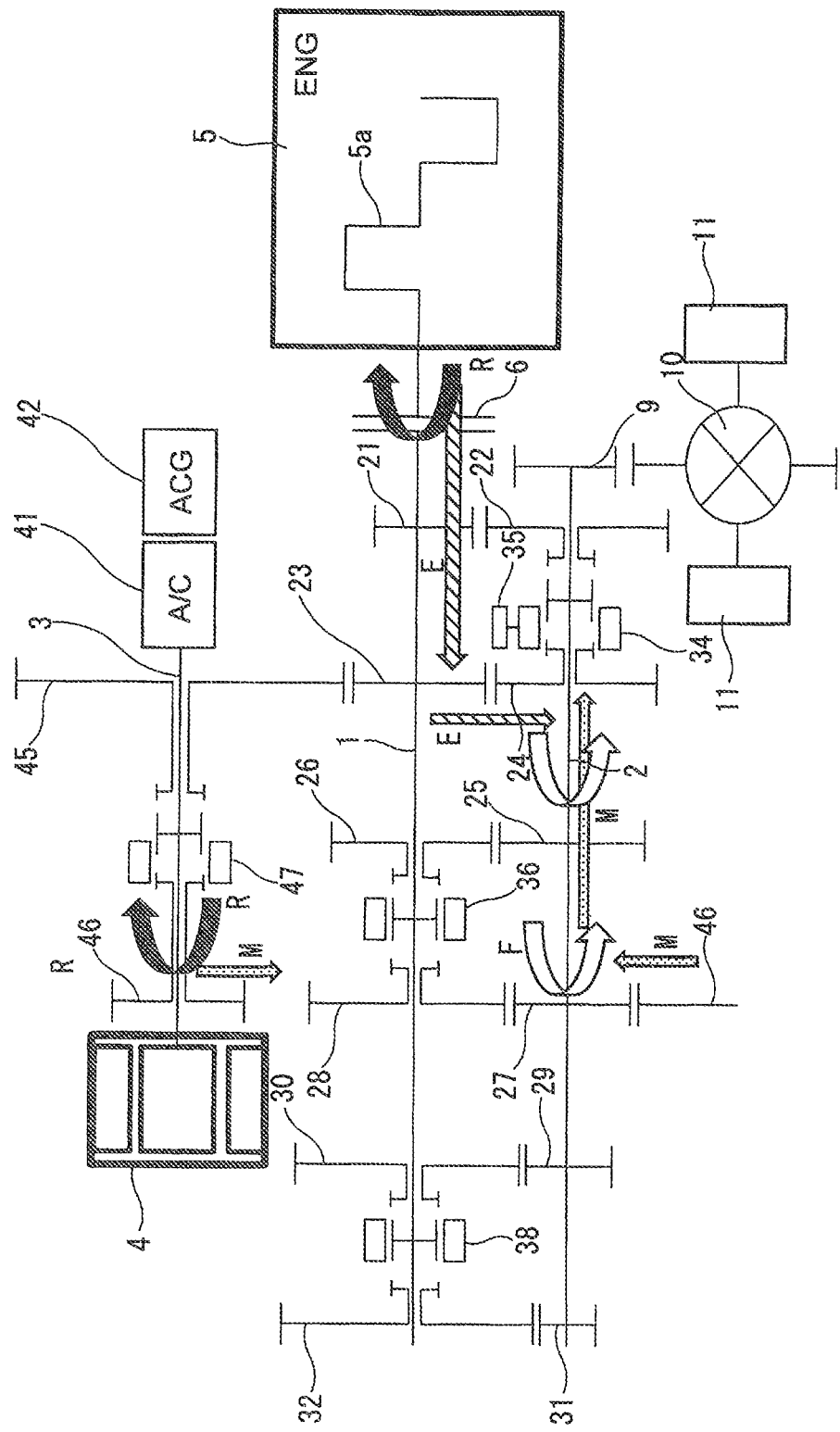
FIG. 16 is an operation explanation view at a travel of the vehicle.
Figure 17:
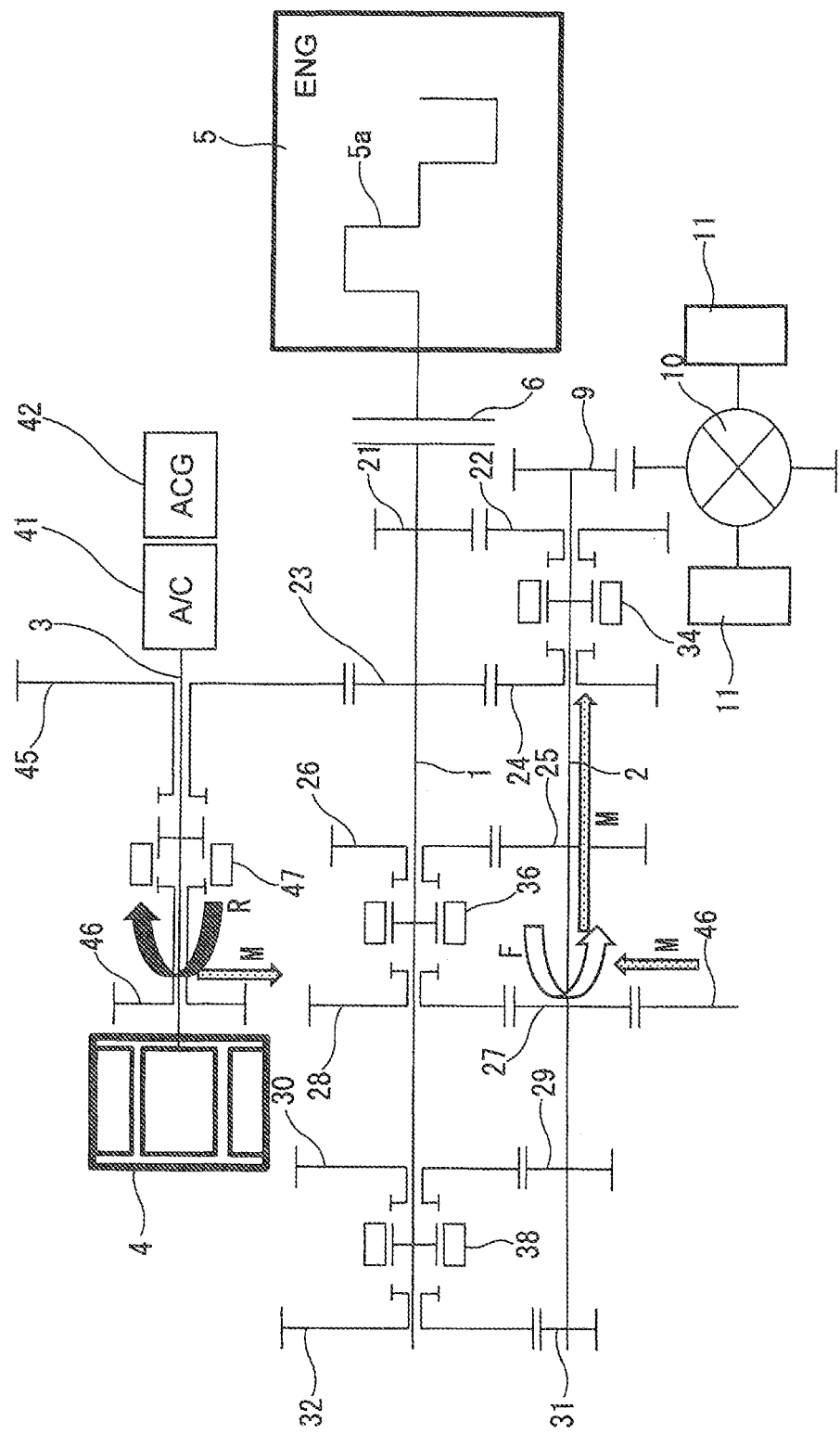
FIG. 17 is an operation explanation view at an EV travel.

On the other hand, the torque of the motor 4 is transmitted through the second motor gear 46 to the counter shaft 2 at the torque assist at the start of the vehicle as shown in FIG. 14, at the torque assist at the shift as shown in FIG. 15, at the torque assist at the travel of the vehicle as shown in FIG. 16, at the EV travel as shown in FIG. 17. Accordingly, the rotation direction of the motor 4 is driven in the reverse direction, unlike the first embodiment.

Figure 18:
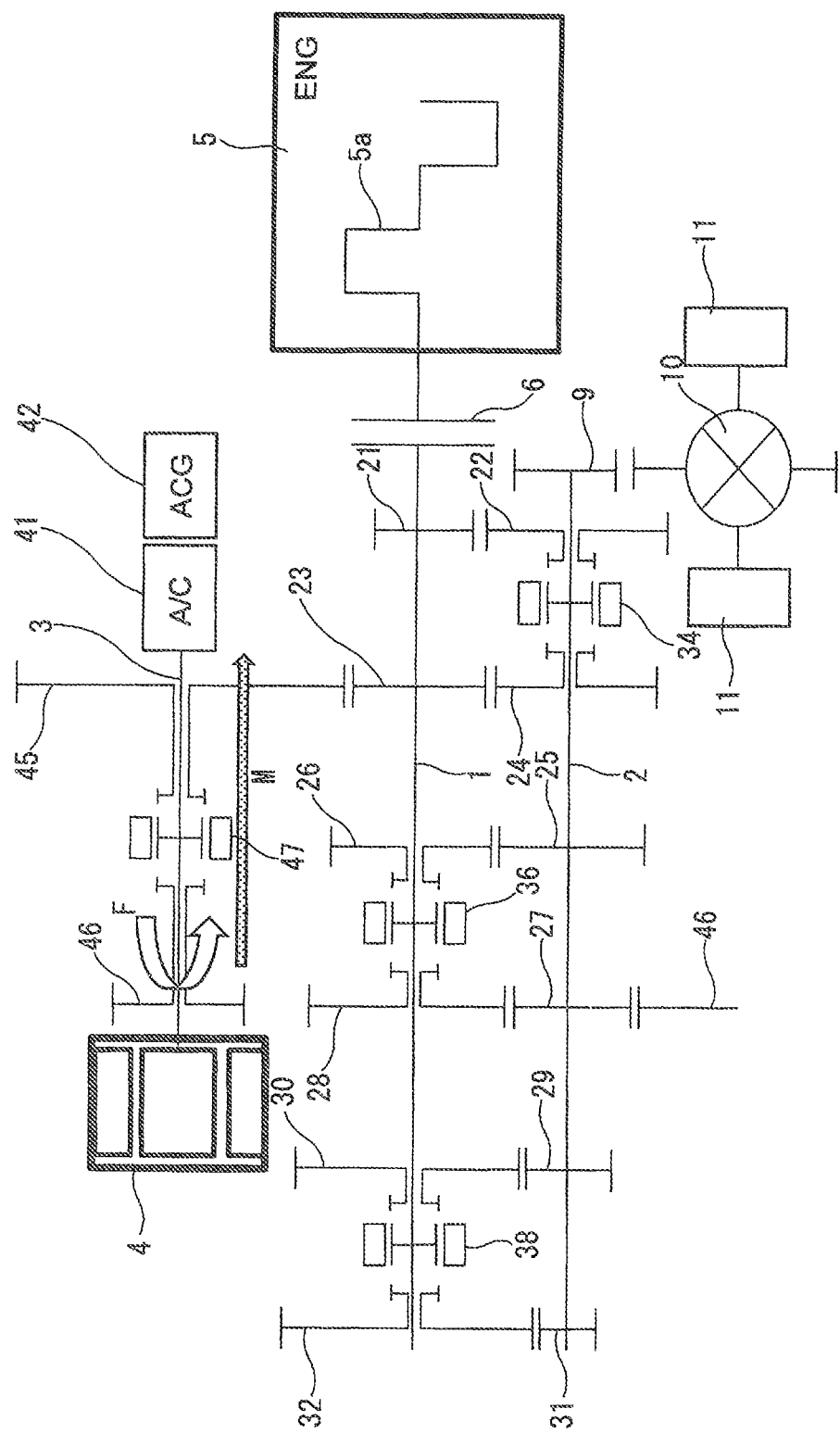
FIG. 18 is an operation explanation view when an auxiliary equipment is driven during the stop of the vehicle.

At the driving of the auxiliary equipment during the idling stop as shown in FIG. 18, the rotation direction of the motor 4 is an arbitrary direction.

Figure 19:
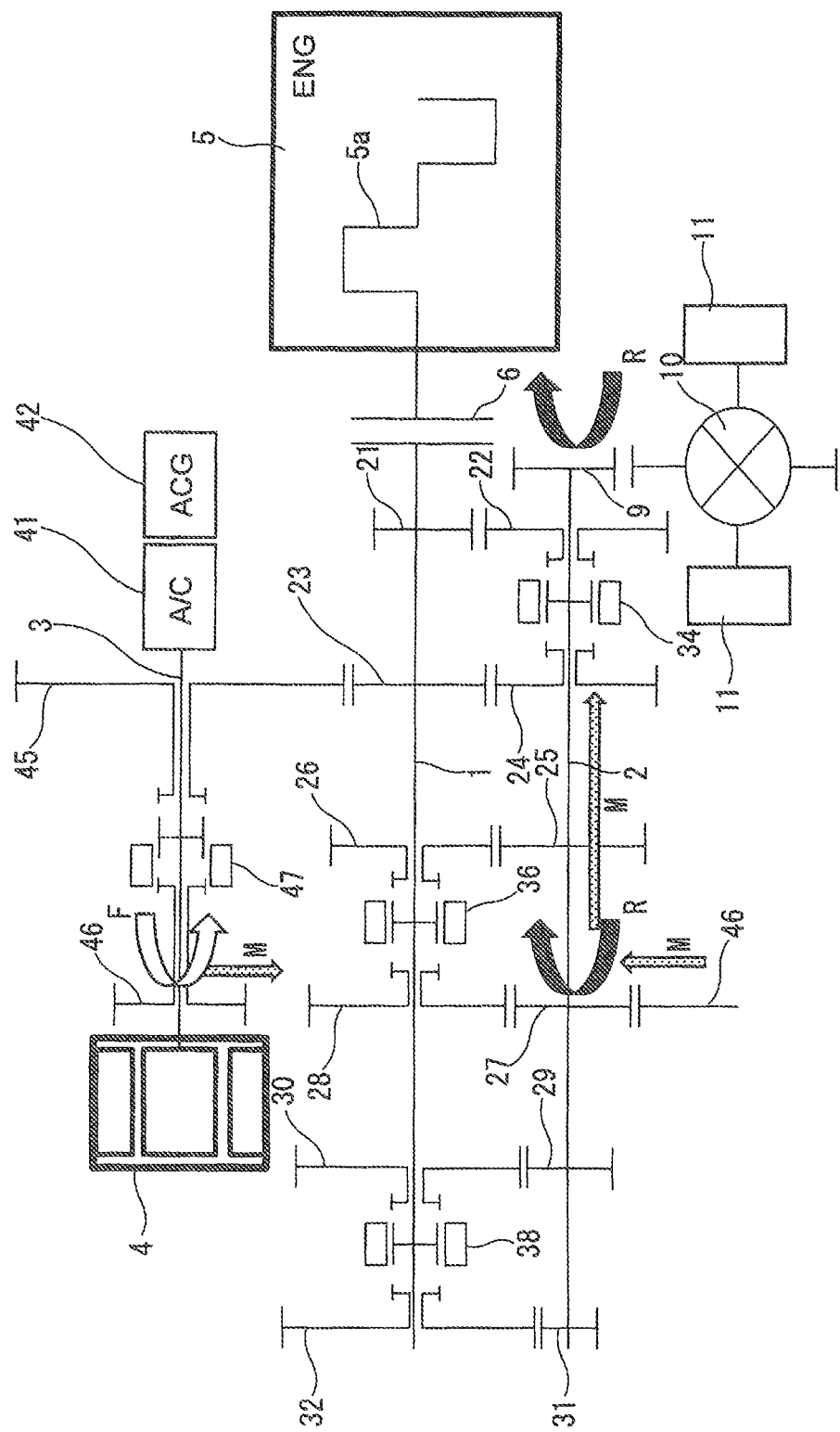
FIG. 19 is an operation explanation view at a backward travel of the vehicle.

At the travel of the vehicle in the backward direction as shown in FIG. 19, the vehicle can travel in the backward direction by driving the motor 4 in the forward direction.

Hereinabove, the transmission device according to the embodiment of the present invention is the transmission device having the forward six speeds. However, the present invention is applicable to a transmission device having seven speeds or more.

In the present invention, a transmission device for a hybrid vehicle including a motor and an internal combustion engine which serve as driving sources, the transmission device including: a main shaft; a counter shaft; a plurality of shift gear rows each including a fixed side gear fixed on one of the main shaft and the counter shaft, and a movable side gear disposed to be raced with respect to the other of the main shaft and the counter shaft, and each constituting one of a plurality of shift stages; a plurality of shift dog clutches each arranged to selectively engage the movable side gear of one of the shift gear rows with the other of the main shaft and the counter shaft; a main clutch disposed between the internal combustion engine and the main shaft; a first motor gear disposed to be raced with respect to a motor output shaft connected to the motor, and constantly interlocked with the main shaft; a second motor gear disposed to be raced with respect to the motor output shaft, and constantly interlocked with the counter shaft; a motor dog clutch arranged to selectively engage one of the first motor gear and the second motor gear with the motor output shaft; and a controller configured to control actuations of the shift dog clutch, the main clutch, and the motor dog clutch.

In this configuration, the motor output shaft can be interlocked through the motor dog clutch to one of the main shaft and the counter shaft. Accordingly, it is possible to add the torque to the counter shaft by the motor when the shift is performed by the shift dog clutch. For example, it is possible to add the torque directly to the counter shaft through the motor dog clutch and the second motor gear, without passing through the shift dog clutch.

Moreover, for example, in a state where the vehicle does not travel and the counter shaft is not rotated, the motor output shaft can be interlocked with the main shaft through the motor dog clutch and the first motor gear. Accordingly, it is possible to start (crank) the internal combustion engine by using the motor, and to drive the motor by the internal combustion engine to perform the power generation.

The first motor gear is engaged with the fixed side gear of one of the shift stages which is fixed on the main shaft. Accordingly, the first motor gear and the main shaft are constantly interlocked with each other through the fixed side gear.

In the present invention, the second motor gear is interlocked with the fixed side gear of one of the shift stages which is fixed on the counter shaft, through an idler gear arranged to inverse a rotation direction. Accordingly, the second motor gear and the counter shaft are constantly interlocked with each other through the fixed side gear and the idler gear. In this case, the driving directions (the rotation directions) of the motor at the engagement of the first motor gear and at the engagement of the second motor gear are identical to each other with respect to the same vehicle travel direction.

In the present invention, the first motor gear is engaged with the fixed side gear of one of the shift stages which is fixed on the main shaft; the second motor gear is engaged with the fixed side gear of one of the shift stages which is fixed on the counter shaft; and when the vehicle travels in the same direction, a driving direction of the motor at an engagement of the first motor gear is opposite to a driving direction of the motor at an engagement of the second motor gear. That is, in this case, the idler gear arranged to inverse the rotation direction is not needed for the first motor gear and the second motor gear.

In the present invention, an auxiliary equipment such as a compressor for an air conditioner is connected to the motor output shaft; and the motor dog clutch includes a neutral position. In this structure, it is possible to drive the auxiliary equipment during the travel of the vehicle by using the internal combustion engine or the motor. Moreover, even when the vehicle is stopped, it is also possible to drive only the auxiliary equipment by the motor by bring the motor dog clutch to the neutral position.

In the present invention, the transmission device does not include a shift gear row for a backward travel of the vehicle; and the vehicle travels in the backward direction by a reverse rotation of the motor.

In the transmission device for the hybrid vehicle according to the present invention, it is possible to add the motor torque to the counter shaft at the shift, without passing through the shift dog clutch, and thereby to suppress the temporal decrease of the torque at the shift. Moreover, the transmission device does not need the multiple plate clutch arranged to transmit the motor torque in the variable manner. Consequently, it is possible to simplify the configuration and the control. Furthermore, the shift gear row is basically constituted by the two shafts. Accordingly, it is possible to avoid the size increase of the transmission device.

The entire contents of Japanese Patent Application No. 2016-059340 filed Mar. 24, 2016 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:
1. A transmission device for a hybrid vehicle including a motor and an internal combustion engine which serve as driving sources, the transmission device comprising:
   a main shaft;
   a counter shaft;
   a plurality of shift gear rows each including a fixed side gear fixed on one of the main shaft and the counter shaft, and a movable side gear disposed to be raced with respect to the other of the main shaft and the counter shaft, and each constituting one of a plurality of shift stages;
   a plurality of shift dog clutches each arranged to selectively engage the movable side gear of one of the shift gear rows with the other of the main shaft and the counter shaft;
   a main clutch disposed between the internal combustion engine and the main shaft;
   a first motor gear disposed to be raced with respect to a motor output shaft connected to the motor, and constantly interlocked with the main shaft;

a second motor gear disposed to be raced with respect to the motor output shaft, and constantly interlocked with the counter shaft;

a motor dog clutch arranged to selectively engage one of the first motor gear and the second motor gear with the motor output shaft; and a controller configured to control actuations of the shift dog clutches, the main clutch, and the motor dog clutch;

wherein the first motor gear is engaged with the fixed side gear of one of the shift stages which is fixed on the main shaft; the second motor gear is engaged with the fixed side gear of one of the shift stages which is fixed on the counter shaft; and when the vehicle travels in the same direction, a driving direction of the motor at an engagement of the first motor gear is opposite to a driving direction of the motor at an engagement of the second motor gear.

2. The transmission device as claimed in claim 1, wherein an auxiliary equipment is connected to the motor output shaft; and the motor dog clutch includes a neutral position.

3. The transmission device as claimed in claim 1, wherein the transmission device does not include a shift gear row for a backward travel of the vehicle; and the vehicle travels in the backward direction by a reverse rotation of the motor.

4. The transmission device as claimed in claim 1, wherein the plurality of shift gear rows comprises:

a first shift gear row comprising a first fixed side gear and a first movable side gear;

a second shift gear row comprising a second fixed side gear and a second movable side gear;

a third shift gear row comprising a third fixed side gear and a third movable side gear;

a fourth shift gear row comprising a fourth fixed side gear and a fourth movable side gear;

a fifth shift gear row comprising a fifth fixed side gear and a fifth movable side gear; and a sixth shift gear row comprising a sixth fixed side gear and a sixth movable side gear.

5. The transmission device as claimed in claim 4, wherein the first motor gear is engaged with the second fixed side gear, which is fixed on the main shaft.

6. The transmission device as claimed in claim 5, wherein the second motor gear is engaged with the fourth fixed side gear, which is fixed on the counter shaft.

7. The transmission device as claimed in claim 6, further comprising an idler gear, wherein the second motor gear is engaged with the fourth fixed side gear through the idler gear.

8. The transmission device as claimed in claim 4, further comprising at least one of a compressor or a generator directly connected to the motor output shaft.

9. The transmission device as claimed in claim 4, further comprising a compressor and a generator directly connected to the motor output shaft.

* * * * *